(No Model.)

M. C. ROCKTEACHER & J. H. McKEON.
PLUMB LEVEL.

No. 477,312. Patented June 21, 1892.

Witnesses

Inventors.
Martin C. Rockteacher and
John H. McKeon,
By Benedict and Morsell,
Attorneys.

UNITED STATES PATENT OFFICE.

MARTIN C. ROCKTEACHER AND JOHN H. McKEON, OF EAGLE, WISCONSIN.

PLUMB-LEVEL.

SPECIFICATION forming part of Letters Patent No. 477,312, dated June 21, 1892.

Application filed April 2, 1892. Serial No. 427,443. (No model.)

*To all whom it may concern:*

Be it known that we, MARTIN C. ROCK-TEACHER and JOHN H. McKEON, of Eagle, in the county of Waukesha and State of Wisconsin, have invented a new and useful Improvement in a Combined Level and Plumb, of which the following is a description, reference being had to the accompanying drawings, which are a part of this specification.

Our invention has relation to a combined level and plumb. Its objects are to provide an instrument for not only determining the horizontality and perpendicularity of a structure or piece of work, but also one wherein the exact inclination of a surface may be readily determined in degrees, the position of the index-finger being discernible from either the sides or top of the instrument.

The invention further contemplates simplicity and general efficiency; and it consists in the improved construction and combination of parts, as hereinafter more fully set forth.

Figure 1:
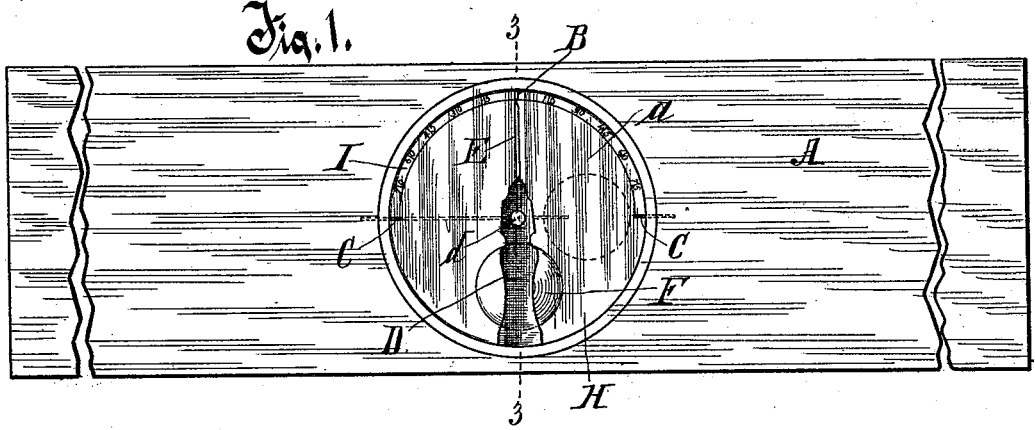
Figure 2:
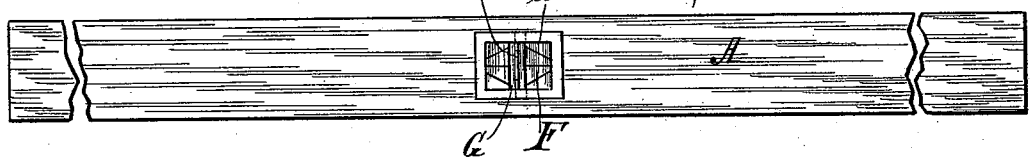
Figure 3:
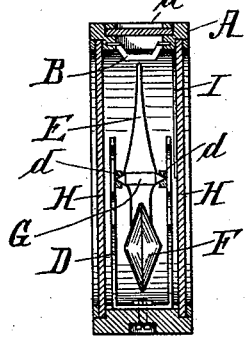

In the accompanying drawings, Figure 1 is a side elevation, the dotted lines indicating the position the index assumes when the device is used as a plumb and applied to a true perpendicular surface. Fig. 2 is a plan view. Fig. 3 is a transverse sectional view on the line 3 3, Fig. 1.

Like letters of reference refer to like parts throughout the several views.

Referring to the drawings, the letter A indicates a stock having a transverse circular aperture $a$ and upon its upper edge a glass-covered intersecting opening $a'$, preferably rectangular in shape. Extending below this opening is a strip B, while projecting from diametrically-opposite points of the circular aperture, exactly ninety degrees from each side of the strip B, are metallic points C C. A U-shaped standard D is secured within the aperture, the vertical arms thereof provided near their upper ends with inwardly-extending bearings $d\ d$.

The letter E indicates the index-finger, having its upper end pointed and its lower end provided with a plummet or weight F. This index is also formed or provided medially with a transverse shaft G, having pointed ends entering the bearings $d\ d$ and forming a very sensitive pivot. Glass plates H H cover aperture $a$, and thereby inclose all the working parts. Within the inclosure is also arranged a graduated scale I, one hundred and eighty degrees of the circle being indicated in the drawings. The index of course is free to swing in a complete circle, and the projections B and C C protrude far enough to come in close proximity to the point of the index, but not in direct contact therewith.

When the device is used as a level, the position of the object as to horizontality is determined by the position assumed by the index. If it takes a perfectly-perpendicular position, pointing directly to the strip B, it is of course known at once that the surface of the object is level, while if the pendulum-index comes to rest with its pointed end to one side of this strip B the object is out of true horizontal line, the exact amount of deflection being indicated in degrees by the scale.

In order to use the instrument as a plumb, all that is necessary is simply to turn the stock A either end up and apply it in the usual manner. In this instance the points C C are the guides for determining the true perpendicularity.

From the above it will be seen that our device is exceedingly simple in construction and inexpensive of production, while the few parts constituting the same are thoroughly protected. Furthermore, it is apparent that the readiness with which the movements of the index may be seen either from the sides or top make this an exceedingly convenient device.

Having thus described our invention, what we claim, and desire to secure by Letters Patent of the United States, is—

1. The combination, with a stock provided with a central transverse aperture and intersecting glass-covered aperture in the top edge thereof, a medially-pivoted index within the central aperture adapted to have a complete circular swing and having a pointed upper end and a weighted lower end, a strip extending below the top aperture, and glass side pieces covering the transverse aperture, substantially as set forth.

2. In a combined level and plumb, the combination of a stock provided with a central transverse aperture and an intersecting glass-covered aperture in the top edge thereof, a medially-pivoted index within the central aperture having a pointed upper end and a weighted lower end and adapted to have a complete circular movement, a strip extending below the top aperture, inwardly-projecting strips at diametrically-opposite points of the bordering edges of the central aperture, a graduated scale, and glass side pieces covering the central aperture, substantially as set forth.

3. In a combined level and plumb, the combination of a stock provided with a central transverse aperture and an intersecting glass-covered aperture in the top edge thereof, a U-shaped standard having inwardly-extending bearings at its upper ends, an index having a pointed upper end, a lower weighted end, and a medial transverse shaft having its pointed extremities turning in the bearings, said index constructed to have a complete circular movement, a strip extending below the top aperture, inwardly-extending strips at diametrically-opposite points of the transverse aperture, a graduated scale, and glass side pieces covering the central aperture, substantially as set forth.

In testimony whereof we affix our signatures in presence of two witnesses.

MARTIN C. ROCKTEACHER.
JOHN H. McKEON.

Witnesses:
LEWIS N. LEAN,
JOHN T. HENNESSY.